Patented Nov. 28, 1933

1,937,039

UNITED STATES PATENT OFFICE 1,937,039

METHOD OF TREATING SLAGS

John Johnston, Short Hills, N. J., and Harley C. Lee, Maple Grove, Ohio, assignors to United States Steel Corporation, New York, N. Y., a corporation of New Jersey No Drawing. Application August 28, 1931
Serial No. 560,048

4 Claims. (Cl. 209—2)

This invention relates to metallurgy, and more particularly to steel metallurgy and has for its object the provision of a method of beneficiating slags from steel-making furnaces by separating them in two or more fractions, one being impoverished in the deleterious phosphorus content and enriched in iron and manganese content and suitable to be returned to a metallurgical furnace, the other being enriched in phosphorus content and impoverished with respect to iron and manganese content.

Another object of this invention is to provide a method of achieving a satisfactory separation of the phosphorus-bearing constituents of the slag from those which comprise the bulk of the iron and manganese.

Still another object of this invention is to provide a slag-treating process to render slags from open hearth, electric or other steel furnaces suitable for re-use of the valuable constituents.

Other objects and advantages will become apparent as the invention is more fully disclosed.

In accordance with the objects of the present invention we have found that in the usual steel-making slag, when it is cold and so amenable to direct observation, the phosphorus occurs as oxide largely associated with lime and silica in the form of discrete crystals, and that the iron oxide and manganese oxide occur largely in association with lime and magnesia as crystals of another type. We have found that the crystals containing the iron and manganese oxides are of relatively high specific gravity and of relatively high magnetic susceptibility whereas those comprising the bulk of the phosphorus are of relatively low specific gravity and are comparatively non-magnetic. The phosphorus-containing crystals are substantially constant in type but may vary somewhat in composition. The iron-manganese-bearing crystals vary somewhat in physical characteristics with variations in the gross composition of the slag. The latter, however, are always of materially higher specific gravity than the phosphorus-containing crystals and possess greater magnetic susceptibility.

We propose therefore to take advantage of the differences in specific gravity and in magnetic susceptibility of these two types of constituents of the cooled slag, to effect a separation of the slag into two fractions; one fraction enriched in iron and manganese and impoverished in phosphorus and silica; the second fraction enriched in phosphorus and silica and impoverished in iron and manganese. The first fraction may after suitable preparation be returned to the furnace, and the second fraction may be used as a fertilizer or otherwise disposed of. This fractionation may be achieved either by hydraulic or other separation methods based on differences in specific gravity; by magnetic separation methods or by flotation. Combinations of these methods may be employed, if desired.

We have found however that in order successfully to apply these methods of separation to the slag, it is essential for best results that the liquid slag be treated in such a way as to provide opportunity for the phosphorus-silica compounds and the iron-manganese oxide compounds (with lime and magnesia) to form in relatively large crystals and to segregate. Thereafter the slag must be finely comminuted to insure that the two types of crystal particles are substantially detached from one another. The finely divided slag particles are then treated by the specific magnetic, wet concentration, or flotation method desired to effect substantial separation of the two typical materials.

As a specific embodiment of the present invention we will disclose the same as we have applied it to basic open-hearth furnace slags, employing an electromagnetic method to effect the separation of the two fractions. Such slags normally comprise the following main constituents—lime, magnesia, silica with manganese, iron and phosphorus oxides commonly ranging as follows: FeO from 10 to 30%; MnO from 3 to 12% and $P_2O_5$ from 1 to 5%. The specific proportions of all constituents vary widely from time to time depending upon furnace conditions; in some cases the phosphorus content may run much higher than as above indicated. The liquid slag is allowed to cool as slowly as is practicable during the period of crystallization as a means of promoting the growth of relatively large crystals of both types, and their segregation. Crystal growth may also be enhanced by any of the familiar general methods, by the use of steam or other so-called mineralizer, by seeding the slag just before it begins to freeze with particles of wet cold slag or other appropriate nuclei, or by the use of any means to ensure extremely slow crystallization of the constituents.

Thereafter the slag is ground or comminuted in any convenient manner to a particle size small enough to permit of substantial separation of one crystal type from the other. The finely divided slag particles are then passed over a magnetic separator of standard type in a manner as heretofore known to the art, and so separated in more magnetic and less magnetic fractions.

This may be repeated or the fractions may be subjected to further concentration by other methods, if desired.

The magnetic susceptibility of the compounds comprising the iron manganese fraction is dependent primarily upon the amount of iron present. From an analysis of the slag this can be readily determined and the magnetic field strength in the separator adjusted accordingly to yield the highest degree of separation. It is preferable to use a magnet strength that is just sufficient to attract the iron-manganese portion of the slag as higher magnet strength may cause material amounts of the phosphorus portion to be occluded therewith, and result in a less effective separation.

We have found that by this method of separation over 90% of the total iron and manganese oxides present in the original slag may be segregated in one fraction, the phosphorus content thereof being variable depending upon the efficiency of the prior steps of crystallization and comminuting and upon the magnetic strength employed. The phosphorus content may be readily reduced to less than one half the original amount and materially lower if appropriate attention is paid to the details mentioned above.

Whereas we have disclosed as a specific embodiment of the present invention the separation of the phosphorus and the iron manganese compounds by magnetic separation means we are not to be limited thereby. Wet concentration or separation methods based upon differences in specific gravity are equally applicable. We have found for example, with a particular open-hearth slag, that the specific gravity of the slag fraction in which the phosphorus compound predominates is approximately 3.36 whereas that of the corresponding iron-manganese fraction approximates 3.86. The specific gravity of the fractions will vary somewhat depending upon the relative proportion of constituents contained therein. Heretofore known types of apparatus and methods of separation may be applied to the finely divided slag and the efficiency and completeness of separation will be in part dependent upon the efficiencies of the prior steps of growth and segregation of the two constituents during cooling and the degree of comminution applied thereto.

By the practice of this invention the iron-manganese portion, which now has a relatively low phosphorus content, may be returned to a metallurgical furnace and utilized therein. By the re-use of this iron-manganese portion in part or in whole as a slag material, savings in iron and manganese may be made. The phosphorus containing portion may be utilized as a fertilizer constituent or otherwise disposed of, in which case its disposal because of its small volume as compared to the original slag, would constitute a smaller cost per ton of steel produced.

It is apparent from the above disclosure that the present invention is subject to many modifications and departures from the specific embodiment set forth herein without departing essentially from the nature and scope thereof as may be set forth in the following claims:—

What we claim is:

1. The method of treating slags which comprises subjecting the molten slag during the period of crystallization to a discrete treatment tending to enhance the crystalline structure and the isolation of phosphorus and the iron-manganese content thereof into distinct crystalline compounds finely comminuting the same and subjecting the finely divided material to a materials separation method based upon differences in the physical characteristics of the said crystalline compounds.

2. The method of treating slags which comprises subjecting the slag to a discrete cooling step during the period of crystallization to enhance the growth and segregation of the crystalline constituents thereof into distinct crystalline compounds, finely comminuting the same, and thereafter subjecting the finely divided material to a materials separation method based upon differences in the physical characteristics of the said crystalline compounds.

3. The method of treating steel furnace slags which comprises subjecting the slag to a slow cooling during the period of crystallization to enhance the crystal growth and segregation of the phosphorus and of the iron-manganese compounds therein into distinct crystalline compounds, finely comminuting the same, and thereafter subjecting the finely divided material to a materials separation method based upon differences in the physical characteristics of the said crystalline compounds.

4. The method of treating steel furnace slags which comprises subjecting the slag to a slow cooling step during the period of crystallization to enhance the crystal growth and segregation of the phosphorus and the iron manganese compounds therein into distinct crystalline compounds, finely comminuting the same, and thereafter subjecting the finely divided material to magnetic separation.

JOHN JOHNSTON.
HARLEY C. LEE.